No. 672,085. Patented Apr. 16, 1901.
P. B. TINGLEY.
WAVE MOTOR.
(Application filed July 30, 1900.)
(No Model.) 3 Sheets—Sheet 1.
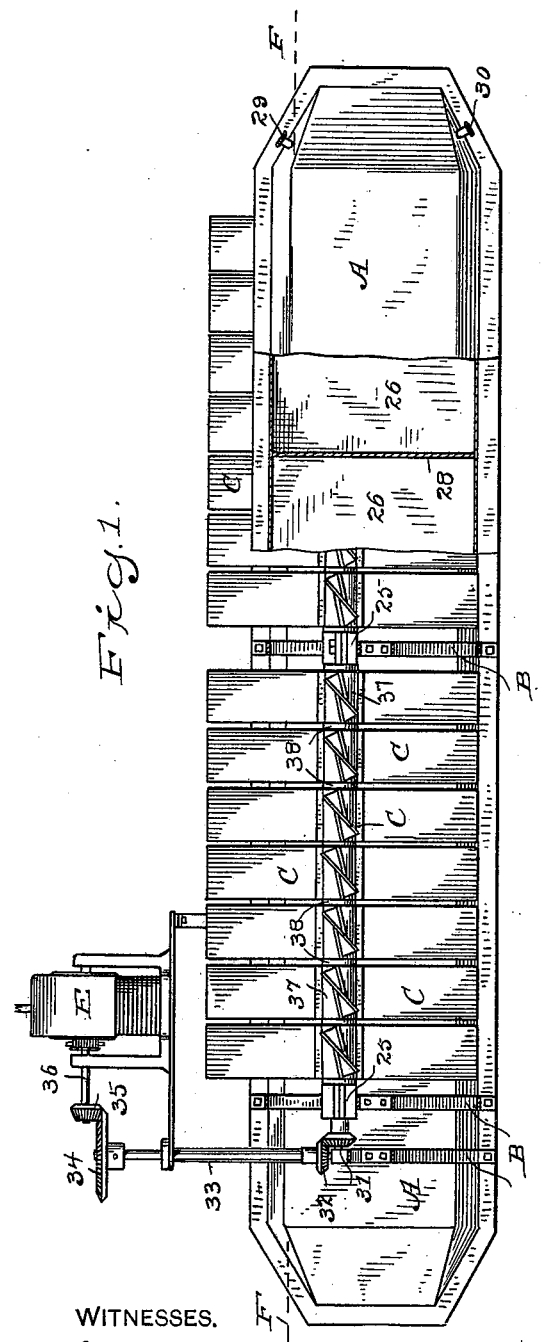
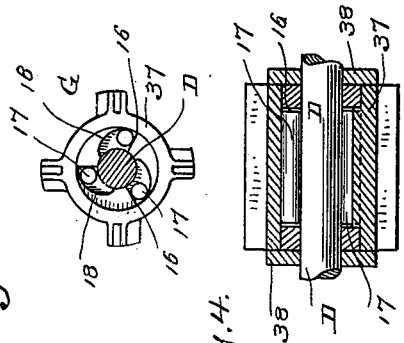
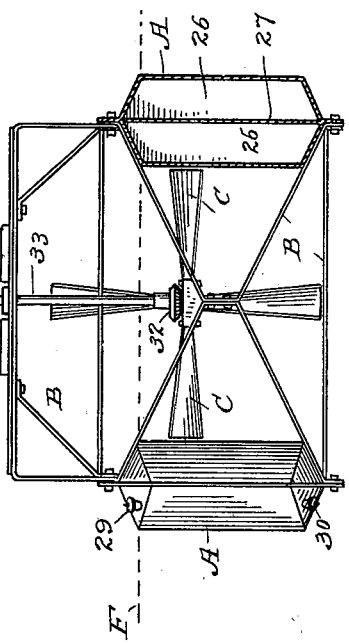
WITNESSES.
INVENTOR.
Philo B. Tingley
By A. M. Wooster
Atty.

No. 672,085. Patented Apr. 16, 1901.
P. B. TINGLEY.
WAVE MOTOR.
(Application filed July 30, 1900.)
(No Model.) 3 Sheets—Sheet 2.
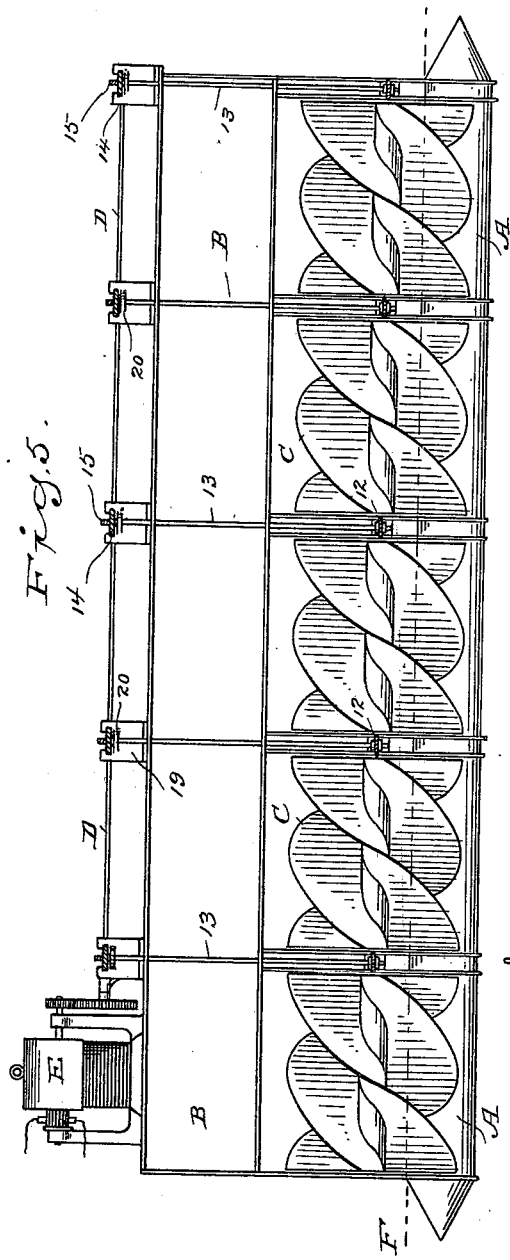
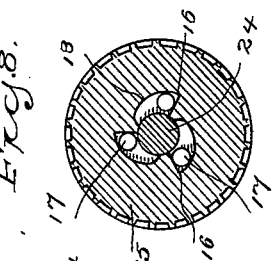
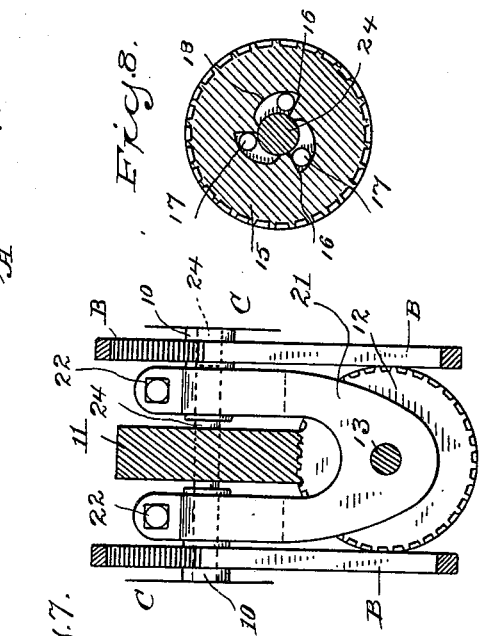
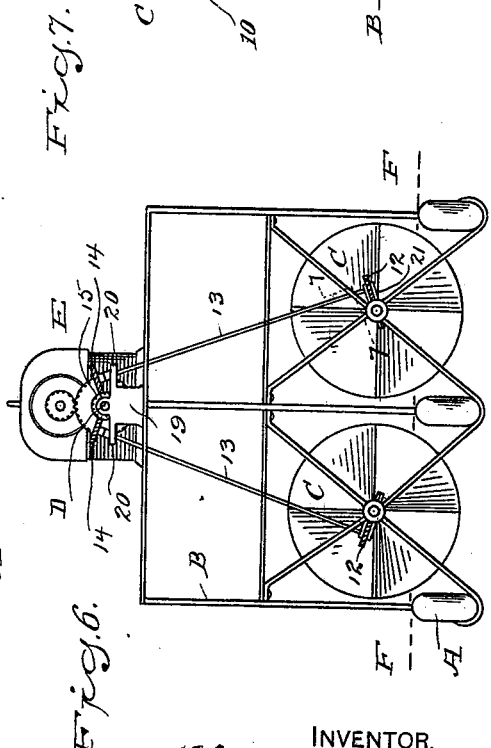
WITNESSES. INVENTOR.
Philo B. Tingley
By
Atty.

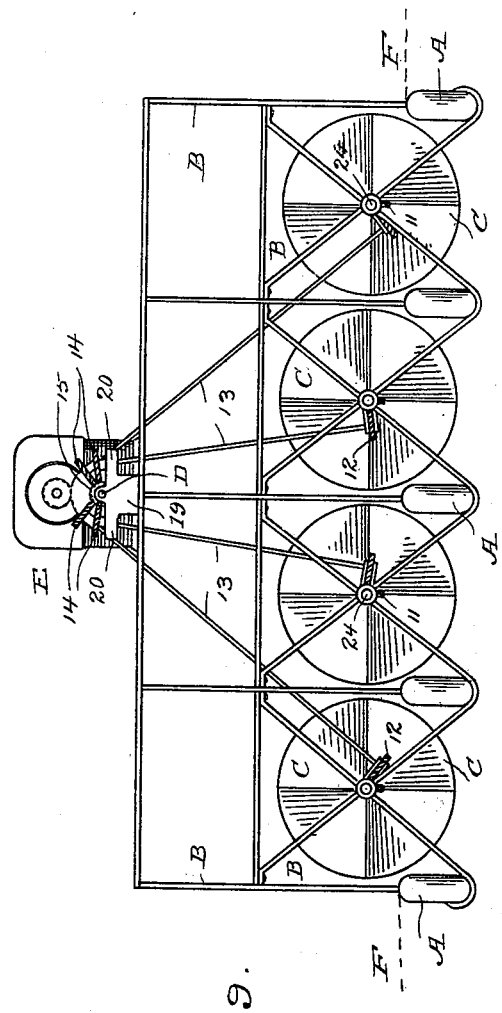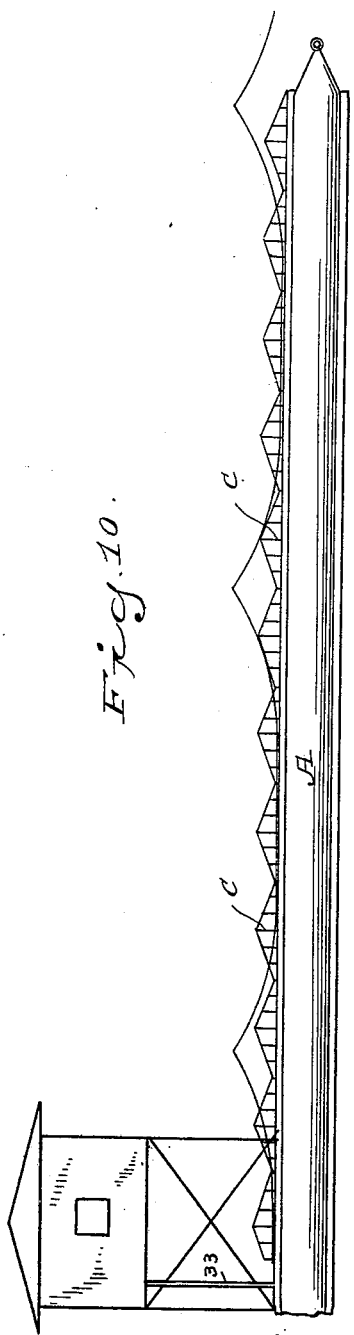

UNITED STATES PATENT OFFICE.

PHILO B. TINGLEY, OF NEW YORK, N. Y.

WAVE-MOTOR.

SPECIFICATION forming part of Letters Patent No. 672,085, dated April 16, 1901.

Application filed July 30, 1900. Serial No. 25,230. (No model.)

*To all whom it may concern:*

Be it known that I, PHILO B. TINGLEY, a citizen of the United States, residing at New York, county of New York, State of New York, have invented a new and useful Wave-Motor, of which the following is a specification.

My invention has for its object to provide a motor capable of responding to the motion of waves and so constructed as to utilize wave-power in the production of continuous rotary motion.

In order to understand the operation of my invention, it is necessary to understand the action of waves upon which the invention depends. The principle of wave action may be briefly stated as follows: Suppose, for example, that waves are rolling inward toward the shore. I have discovered by numerous experiments that it is only the masses of water in the waves that are at any moment moving toward the shore. These masses of water I therefore term "live water" and the water between the waves "dead-water." By that I mean water that is practically motionless so far as any appreciable movement toward the shore is concerned. The live—*i. e.*, the active or moving water in each wave—begins where the wave commences to rise above the normal water-line, and this mass of water is continually moving inward toward the shore, there being, however, between the waves—*i. e.*, masses of live or moving water—areas of dead or motionless water, so far as any movement toward the shore is concerned. In order to fully utilize this principle of wave motion, I have devised a motor consisting, essentially, of a series of screws so connected to a shaft as to carry said shaft forward when the screws are acted upon by a wave or mass of live water, each screw, however, becoming not only inoperative, but being disconnected from the shaft the instant a wave ceases to act upon it, so that none of the screws are at any time compelled to carry dead-water, and the entire force of the live water upon the blades of the screws is utilized to drive the shaft forward, as is fully set forth in the following description and the accompanying drawings, forming part of this specification, reference characters being used to designate the several parts.

Figure 1 is an elevation, partly broken away, illustrating one mode in which I have utilized the principle of my invention; Fig. 2, an end elevation as seen from the left in Fig. 1, one portion being in vertical section; Figs. 3 and 4, detail views, on an enlarged scale, illustrating a form of clutch mechanism which I have found admirably adapted for use as a connection between the hubs of the screws and the shaft; Fig. 5, a side elevation illustrating another form in which I have carried the principle of my invention into effect; Fig. 6, an end elevation corresponding with Fig. 5; Fig. 7, a sectional view, on a greatly-enlarged scale, on the line 7 7 in Fig. 6; Fig. 8, a section on the same scale of one of the clutch-wheels on the power-shaft; Fig. 9, a view corresponding substantially with Figs. 2 and 6, but showing additional series of screws geared to the power-shaft; and Fig. 10 is a diagrammatic view illustrating the action of waves upon the screws of my novel motor.

A denotes pontoons or floats, which may be of any ordinary or preferred construction or design; B, framework secured to and supported by the pontoons; C, screws, and D the power-shaft.

In the form illustrated in Figs. 1 to 4, inclusive, the power-shaft is shown as journaled in boxes 25, supported by the framework between the pontoons. The size, design, and general construction of the pontoons or floats is a matter to be left to the judgment of the builder, as these features of construction must be regulated to a certain extent by the special requirements of the use to which the motor is to be placed. In the present instance I have shown the space in the interior of the pontoons as divided into compartments 26 by means of a longitudinal wall 27 and transverse walls 28. The dotted line F in the drawings indicates the water-line. It should be understood, however, that the depth to which the pontoons, and with them of course the screws, are submerged is a matter that requires to be regulated to a certain extent in accordance with the conditions of use, the height, and power of the waves, &c. I have shown the pontoons as provided with upper and lower valves, which I have designated, respectively, by 29 and 30. It is of course well understood that it is common to increase or decrease the submergence of pontoons and other floating bodies by admitting water when it is desired to submerge them to a greater extent and by pumping in air and forcing out water when it is desired to raise them relatively to the water-line. This I contemplate doing in any ordinary or preferred manner, and therefore make no illustration of means for accomplishing the desired result, as specifically it forms no portion of my present invention. In the present instance I have shown the power-shaft as provided with a bevel gear-wheel 31, which meshes with a bevel-pinion 32 on a vertical shaft 33, said vertical shaft 33 carrying at its upper end a bevel gear-wheel 34, which meshes with a bevel-pinion 35 on a shaft 36, which may be the power-shaft of a dynamo E or may be geared to mechanism of any character to which it is desired to impart motion. The screws C in this form are mounted on the main shaft, to which they are connected by means of clutches G, which may be of any ordinary or preferred construction and which permit the screws to turn backward freely on the power-shaft, but which carry said power-shaft when they are driven forward. I have found in practice that a simple form of roller and incline clutch, such as I have illustrated in the drawings, meets the requirements perfectly. The hubs 37 of the screws are shown as provided with recesses 16, adapted to receive rollers or balls 17, which lie between said hubs and the power-shaft, said recesses on one side running into inclines 18, so that when the screws are turned toward the right, as shown in Fig. 3, as by the action of the live water of waves, the rollers or balls will lock the screws to the power-shaft and the screws will carry the power-shaft, and when the screws are turned backward or are held stationary by the dead-water between waves the rollers or balls in the hubs of the special screws which are in dead-water will lie in the recesses, so that the entire power generated by the action of the waves upon other screws will be utilized to carry the power-shaft forward, none of the power of the screws that are in live water being wasted through dragging of the screws that are in dead-water. The special size of the screws is not of the essence of my invention. They may be, for example, from one to two feet or more in width, and any number of screws that is well within the strength of the frame may be placed in a series. In practice the screws may be placed close together, Fig. 1 of the drawings indicating that they are separated by washers 38.

In the form illustrated in Figs. 5 to 8, inclusive, the screws are shown as provided with journals 24, which turn in hubs 10 in the framework and carry oblique gear-wheels 11. These oblique gear-wheels mesh with oblique gear-wheels 12 on shafts 13, which carry at their other ends oblique gear-wheels 14, said oblique gear-wheels 14 meshing with correspondingly-toothed clutch-gears 15 on the power shaft D, which in this form is journaled in standards 19, supported by the framework. The special manner in which the shafts 13 are supported is not of the essence of my invention. I have shown the upper ends of said shafts as journaled in arms 20, extending from standards 19, and the lower ends of said shafts as journaled in brackets 21, which are clamped, by means of bolts 22, upon the hubs 10. Brackets 21 are in practice provided with vertical recesses to receive the gear-wheels 11 on journals 24 and with horizontal recesses to receive the gear-wheels 12 on shafts 13.

It will of course be understood that a machine adapted for general use must be made long enough so as to be acted upon by more than one wave or mass of live water at a time. In order to accomplish this result, I make the framework and series of screws long enough so that under ordinary conditions from three to five or six waves or masses of live water will be acting upon screws in each series simultaneously. It follows, therefore, that continuous rotary motion will be imparted to the power-shaft, although it is not unlikely that half, more or less, of the screws will be inactive at any given instant, a screw that is inactive one instant being active the next, and vice versa. It should be noted, however, as a vitally-important feature of my invention that no matter how many of the screws may be inactive none of the inactive screws drag upon the power-shaft to the slightest extent; but the entire power generated by the active screws is always transmitted to the power-shaft.

As indicated in Fig. 9, there may be a greater number of lines of screws than is indicated in Figs. 2 and 6, said Fig. 9 representing four lines of screws and five floats or pontoons.

As indicated diagrammatically in Fig. 10, by means of the curved lines which meet to form points above the screws, the floats and lines of screws are of such length that a plurality of waves (three in said figure) will be acting simultaneously. In said Fig. 10 also the screws C are indicated as varying in diametrical size, so as to form several subseries of screws, the middle ones of the subseries being larger than the end ones.

As shown in the drawings, particularly in the form represented in Figs. 1 and 2, the pontoons or floats have a considerably greater height than thickness and are elongated to a considerable extent, while the screws are arranged in alinement with each other on a shaft between two pontoons or floats. The space between the latter forms a channel or sluiceway for so much of the surface of the water as is inclosed by said pontoons. Where there are a number of lines of screws side by side with pontoons between them, each line of screws will be in a sluiceway or channel. Therefore when the motor is anchored or otherwise secured with one end pointed in the direction from which the waves are approaching the water passing between the floats must go through the screws without being deflected laterally by contact with the blades of the screws.

In both forms of construction illustrated in the drawings all of the screws of each series are arranged in alinement with each other, and the individual clutches between the screws and the shaft driven thereby are arranged to operate in the same direction for all of the screws of the series. In other words, none of the screws clutch the shaft when turning backward and only when moving forward. The clutches are independent of each other and all are arranged to connect with the shaft to drive it by a uniform direction of rotation and to be disconnected from the shaft when there is either a tendency of a particular screw to move backward or to remain stationary while the shaft is being driven by other screws.

Having thus described my invention, I claim—

1. A wave-motor consisting essentially of a power-shaft, a series of screws alined upon a common axis of rotation, and clutch mechanism intermediate the screws and the power-shaft and operating in the same direction for all of the screws, whereby when screws are turned forward by the action of waves the power-shaft will be carried thereby and screws not turned forward will be disconnected from the power-shaft and dragging thereby prevented.

2. A wave-motor consisting of a power-shaft, a series of screws mounted thereon and a clutch between each screw and the power-shaft, said clutches acting to connect the screws to the power-shaft when the screws are turned forward and to disconnect all screws from the power-shaft while said screws are not being turned forward so that none of the screws at any time drag upon the power-shaft.

3. A wave-motor consisting essentially of a power-shaft, a series of screws alined upon a common axis of rotation, said shaft and screws being supported in a horizontal plane to be acted upon by the surface action of the waves, and clutch mechanism intermediate the screws and the power-shaft and operating in the same direction for all of the screws, whereby when screws are turned forward by the action of waves the power-shaft will be carried thereby and screws not turned forward will be disconnected from the power-shaft and dragging thereby prevented.

4. A wave-motor consisting essentially of a power-shaft, a series of screws in alinement with each other, said screws and shaft having a buoyant float or support adapted to maintain the shaft and screws in a horizontal plane, and clutch mechanism intermediate the screws and the power-shaft and operating in the same direction for all of the screws, whereby when screws are turned forward by the action of waves the power-shaft will be carried thereby and screws not turned forward will be disconnected from the power-shaft and dragging thereby prevented.

5. A wave-motor consisting of a power-shaft, a series of screws mounted thereon and a clutch between each screw and the power-shaft, said clutches acting to connect the screws to the power-shaft when the screws are turned forward and to disconnect all screws from the power-shaft while said screws are not being turned forward so that none of the screws at any time drag upon the power-shaft, said shaft and screws being mounted upon a floating or buoyant support adapted to maintain said screws and shaft in a horizontal plane.

6. A wave-motor comprising a power-shaft, and a series of screws alined upon a common axis of rotation, and having clutch connections with said shaft, the clutches being independent of each other but all arranged to connect with the shaft to drive it by a uniform direction of rotation of the screws.

7. A wave-motor comprising a series of screws mounted upon one shaft and having clutch connections therewith, the clutches being independent of each other but all arranged to connect with the shaft to drive it by a uniform direction of rotation of the screws.

8. A wave-motor comprising a series of screws mounted upon one shaft and having clutch connections therewith, the clutches being independent of each other but all arranged to connect with the shaft to drive it by a uniform direction of rotation of the screws, said screws and shaft being mounted on a floating or buoyant support adapted to maintain the series of screws in a horizontal plane.

9. A wave-motor comprising a pair of narrow elongated and relatively high pontoons or floats arranged to form a channel or sluiceway between them, a power-shaft supported by said floats, a series of screws in alinement with each other in the channel between the floats, and clutch mechanism intermediate the screws and the power-shaft, the clutches being independent of each other and all arranged to connect with the shaft to drive it by a uniform direction of rotation of the screws.

10. A wave-motor comprising a series or train of screws in alinement with each other, means for supporting said series upon the surface of a body of water and in a direction from which waves are approaching, said series being extended so as to be in contact with a plurality of waves, a power-shaft, and independent clutch connections between the screws and the shaft.

In testimony whereof I affix my signature in presence of two witnesses.

PHILO B. TINGLEY.

Witnesses:
S. M. PECK,
G. F. TREMAIN.